United States Patent [19]

Kawahata

[11] 3,719,573
[45] March 6, 1973

[54] PERIODICALLY REVERSED GAS FLOW OZONE PRODUCTION METHOD AND APPARATUS

[75] Inventor: Masayuki Kawahata, Scotia, N.Y.

[73] Assignee: Environment/one Corporation, Latham, N.Y.

[22] Filed: Oct. 15, 1971

[21] Appl. No.: 189,704

Related U.S. Application Data

[62] Division of Ser. No. 5,853, Jan. 26, 1970, Pat. No. 3,663,418.

[52] U.S. Cl. ................................................. 204/176
[51] Int. Cl. ................................................ C01b 13/10
[58] Field of Search ....................... 204/176, 314, 313

[56] References Cited

UNITED STATES PATENTS

| | | | |
|---|---|---|---|
| 2,876,188 | 3/1959 | Thorp et al. | 204/176 |
| 3,622,492 | 11/1971 | Kinney | 204/322 |

Primary Examiner—F. C. Edmundson
Attorney—Charles W. Helzer et al.

[57] ABSTRACT

A periodically reversed gas flow method and apparatus for ozone production is described. Because moisture reduces the efficiency of most ozonizers, moisture is removed from an oxygen containing fluid before it passes through the ozonizer and the moisture is returned to the oxygen and ozone containing fluid after the ozonizer. At least two moisture adsorbent material columns are used so that the oxygen containing fluid is first passed serially through the two columns with the ozonizer interposed and then periodically reversed to pass serially through the three components in the opposite direction so that at least one column is always in an adsorbent cycle while at least another column is always in a desorber cycle. The pressure of the oxygen containing fluid may be increased immediately upstream of the adsorber column and reduced immediately downstream of the adsorber column, for increased efficiency. The heat of adsorption is transferred from the adsorber column to the desorber column to provide the heat of desorption at the latter column, with the ozonizer serially interposed; the coolant fluid flow is preferably co-current to the oxygen fluid flow and reversed everytime that the oxygen containing fluid flow is reversed.

12 Claims, 4 Drawing Figures

INVENTOR
MASAYUKI KAWAHATA

BY Charles W. Helzer
ATTORNEY

PERIODICALLY REVERSED GAS FLOW OZONE PRODUCTION METHOD AND APPARATUS

This is a division of application Ser. No. 5,853, filed Jan. 26, 1970, now U.S. Pat. No. 3,663,418, of Masayuki Kawahata for Periodically Reversed Gas Flow Ozone Production Method and Apparatus.

BACKGROUND OF THE INVENTION

1. Field of the Invention

This invention relates to a periodically reversed gas flow ozone production method and apparatus (hereinafter referred to as PRGF).

2. Prior Art Situation

The composition of the gas produced by an ozonizer usually depends upon the electrical energy input into the ozonizer, the concentration of moisture and impurities in the oxygen containing gas, the oxygen concentration, the temperature and pressure of the gas in the ozonizer, and the ozonizer reactor configurations. Maximum efficiency, with respect to moisture, is obtained with dry air or dry oxygen, preferably of dew point $-60°F$.

Thus, it is known in ozone production to provide a dehumidification system upstream of the ozonizer, which system dehumidification includes a refrigeration moisture extractor and a desiccant dehumidifcation in series. The desiccant dehumidification system usually consists of two adsorbent columns, one of which is in use for the adsorption of water vapor and the other of which is in a regeneration process for the adsorbent. A method of regeneration most commonly employed is so called "thermal swing" process. In this system the regeneration process or cycle usually includes a period within which the adsorbent is heated, a period for holding the high temperature while a separate gas is used for stripping the moisture from the adsorbent, and a period for cooling the adsorbent. This heat exchange is desirable or necessary because the adsorber works best at cooler temperatures and the desorber at higher temperatures. Commonly, the regeneration cycle time is 3 to 8 hours and cycle times shorter than this are impractical because of the high thermal inertia of the adsorbent columns due to the poor heat conductivity and transfer through the adsorbent. Thus, this long regeneration cycle requires dehumidification by refrigeration prior to the desiccant dehumidification, because otherwise the capacity or size of the adsorbent column would become prohibitively large with a correspondingly unreasonably long regeneration cycle.

Another method of regeneration less frequently employed is so called "pressure swing" process. In this system the adsorber in adsorption cycle is operated under pressure considerably higher than that in the adsorber in regeneration cycle. A part of the dry gas produced from the adsorber is used for desorption or regeneration. Therefore, in this system the gas throughput of the adsorber is higher than that required for the process application of the dry air (usually 30 to 60% higher, depending on the pressure of the adsorber and desorber). Consequently, the amount of adsorbent becomes large. Also pressure ratio of the adsorber to the desorber is high, since the amount of dry gas used for desorption is considerably smaller than that passed through the adsorber in the previous adsorption cycle.

Typical yields of ozone from electric discharge ozonizers may be 1.1 to 1.3 pounds per kilowatt hour with ozone concentration approximately 1 percent by weight when dry air is employed. When dry oxygen is used, the ozone yield and ozone concentration are about twice as high as those obtained with dry air, if all the other conditions are the same. The production of ozone and the decomposition of the ozone product take place simultaneously in the ozonizer, with the result that an equilibrium ozone concentration is reached with respect to the ozonizer output. When dry oxygen is employed, this equilibrium concentration may be as high as 10 percent by weight.

SUMMARY OF THE INVENTION

It is an object of the present invention to efficiently remove moisture from the inlet oxygen containing fluid for an ozonizer by using the simplest auxiliary apparatus for fluid drying. The usual situation, wherein the regeneration consumes thermal energy in the thermal swing method or the regeneration requires excess amount and pressure of the dry air in the pressure swing method, is corrected by the present invention to provide an efficient regeneration of the adsorbent without adding high energy for heat or fluid compression. Further, no refrigeration moisture removal is necessary, and relatively small amounts of adsorbent may still be used.

Other impurities such as hydrocarbons also can be removed. However, the main problem solved by the present invention is that of the removal of moisture efficiently.

A first adsorbent is used to remove the moisture from the oxygen containing fluid input to the ozonizer for a certain time interval; an upper limit of time would be when saturation is reached. Thereafter, the oxygen containing fluid is first passed through a second adsorbent material prior to its entry into the ozonizer for moisture removal while the dry oxygen and ozone containing fluid is passed through the first saturated adsorbent for stripping the same of moisture, that is, for regenerating the adsorbent during a desorption cycle. Thus, it is seen that dry ozone bearing gas produced while operating the PRGF in one direction, is employed to recondition the desorbent column of the PRGF for operation as the adsorbent column while the PRGF is operated in the reverse direction. Because the end uses for the ozone produced in the PRGF generally do not require that the ozone be free of moisture, and in most instances require the presence of moisture, an extremely efficient method and apparatus for ozone production is provided.

BRIEF DESCRIPTION OF THE DRAWING

Further objects, features and advantages of the present invention will become more clear from the following detailed description of the drawing wherein.

DETAILED DESCRIPTION OF THE DRAWING

Figure 1:
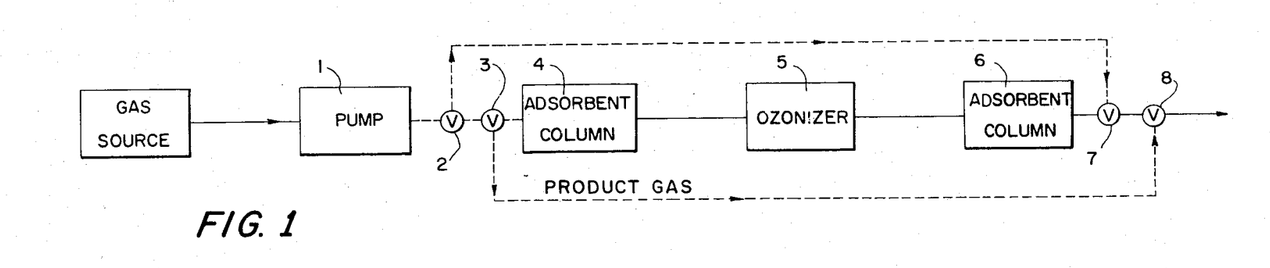
FIG. 1 is a schematic diagram showing the reversible flow of oxygen containing fluid in the production of ozone according to the present invention.

A PRGF apparatus for practicing the method of the invention is shown in FIG. 1. During one period of operation the flow of oxygen containing fluid such as air is shown with solid lines and solid arrows through the various components serially in the following order. The oxygen containing fluid first passes through the pump 1, three-way valve 2, three-way valve 3, a first adsorbent material containing column 4, a conventional ozonizer 5, a second adsorbent material containing column 6, three-way valve 7, and three-way valve 8 for discharge to the point of use or storage. During the above-described flow, the moisture within the oxygen containing fluid is adsorbed in the column 4 so that only dry oxygen containing fluid is passed through the ozonizer 5. Thereafter, the dry fluid mixture of oxygen and ozone is passed through the second adsorbent material containing column 6 as a stripping gas to remove the moisture therein by desorption for regenerating the adsorbent in column 6.

After a certain time interval, the above series connection is changed by operating each of the valves 2, 3, 7 and 8 either manually or automatically so as to produce the following series connection for the fluid flow. After reversal, the oxygen containing fluid passes from the gas source through the pump 1, three-way valve 2, three-way valve 7, adsorbent material containing column 6, ozonizer 5, adsorbent material containing column 4, three-way valve 3, three-way valve 8 for discharge to the point of storage or use. Thus, during the reversed cycle, the regenerated adsorbent within the column 6 will remove the moisture from the oxygen containing fluid prior to its entry into the ozonizer 5, and the dry fluid mixture of ozone and oxygen leaving the ozonier 5 will act as a stripping gas to remove the moisture from the adsorbent material within the column 4 by desorption. If desired, the pump 1 may be located at the opposite end of the system, so as to cause fluid flow through the system by suction and thereby avoid contamination of the oxygen bearing fluid with hydrocarbons, etc. present in lubricants used on the pump. Since the presence of hydrocarbon impurities tends to inhibit ozone production, such alternative is preferred if the pump 1 is not of the type that does not require a lubricant.

Figure 2:
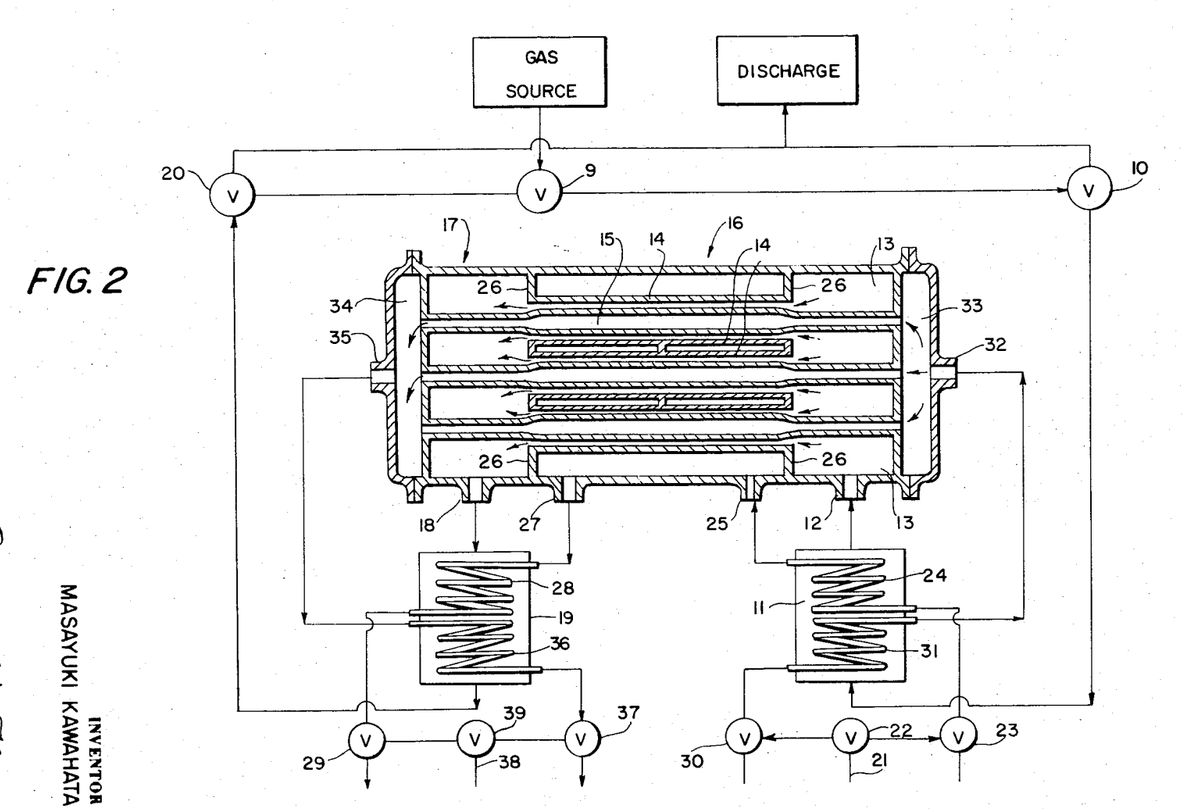
FIG. 2 is a schematic diagram of apparatus employing the process of FIG. 1, and using four adsorbent columns and a coolant system including both electrodes of the ozonizer.

In FIG. 2, the basic system of FIG. 1 is employed in a first embodiment of the present invention. According to a first cycle, oxygen containing fluid passes through three-way valve 9, three-way valve 10, adsorbent column 11, inlet 12 for the adsorbent column 13, the adsorbent column 13, from right to left between the first electrodes 14 and the second electrodes 15 of the ozonizer 16, through the adsorbent column 17 through the outlet 18 of the adsorbent column 17, through the adsorbent column 19, the three-way valve 20, and to the discharge for the product gas containing ozone for ultimate storage or use.

After a certain period of time of operation according to the above cycle, the system is reversed by manually or automatically operating the valves 9, 10 and 20 so that the fluid flow for the oxygen containing gas is as follows: From the gas source through three-way valve 9, three-way valve 20, adsorbent column 19, coupling 18, adsorbent column 17, the space from left to right between the electrodes 14 and 15 of the ozonizer 16, the adsorbent column 13, the coupling 12, the adsorbent column 11, and the three-way valve 10 to discharge for use or storage the ozone thus produced.

During this reversed cycle, the adsorbent containing moisture within the adsorbent columns 11 and 13 undergoes a desorption process whereby the moisture therein is stripped by the dry mixture of oxygen and ozone containing gas flowing from the ozonizer. After about the same time interval as employed in the previous adsorption cycle, the adsorbent material within the adsorbent columns 11 and 13 will have been sufficiently regenerated so that the flow may again be reversed by operating valve 9, 10 and 20 to provide the first-mentioned flow of fluid.

The ozonizer 5 preferably comprises an electric corona discharge type ozonizer that generates heat during operation. However, efficient desorption requires the addition of heat. Accordingly, with the new and improved PRGF method and apparatus, heat generated in the ozonizer is transferred to the desorption column to improve the overall efficiency of the method and apparatus. The heat is transferred from one to the other by means of a coolant system. According to the first cycle of operation when the adsorbent columns 17 and 19 are undergoing a desorption cycle, coolant fluid, preferably water, passes from line supply 21 through three-way valve 22, three-way valve 23, a heat exchanger 24 within the adsorbent column 11, coupling 25 leading to the spaces surrounding the first electrodes 14 for passage upwardly along the right side as indicated in FIG. 2 and downwardly along the left side as dictated by the partition wall 26, the coupling 27, the heat exchanger 28 within the adsorbent column 19, and the three-way valve 29 for discharge. Another coolant circuit, in parallel with the first, provides coolant water or fluid passing through the supply line 21, the three-way valve 22, the three-way valve 30, the heat exchanger 31 in the adsorbent column 11, the coupling 32 leading to a manifold 33 where the flow is split into a path from right to left through the center of each of the electrodes 15 of the ozonizer 16, the manifold 34, the coupling 35, the heat exchanger 36 within the adsorbent column 19, and the three-way valve 37 to the discharge.

When the flow of oxygen containing fluid through the adsorbent columns and ozonizer is reversed, there is a simultaneous actuation of the coolant valves so that the coolant fluid circuit is correspondingly reversed. According to the reversed coolant cycle, the coolant water passes from the line 38 that is directly connected to the supply line 21, through the three-way valve 39, the three-way valve 37, the heat exchanger 36, the coupling 35, the manifold 34, the interior of the electrodes 15, the manifold 33, the coupling 32, the heat exchanger 31, and the three-way valve 30 to the discharge line. The second coolant circuit passes coolant water through the line 38, the three-way valve 39, the three-way valve 29, the heat exchanger 28, the coupling 25, the heat exchanger 24 and the three-way valve 23 to the coolant discharge. The flow of coolant fluid may be in the same direction as the flow of oxygen containing gas or in the opposite direction, with co-current flow being preferred. Heat exchanger coils, 24, 28, 31 and 36 are constructed with electrically poor conductive material, so that they serve electrical separation device between the ozonizer circuit and the coolant water supply and discharge main lines. The cooling water pipe line connected to the high voltage electrode of the ozonizer should also be constructed with electrically poor conductive materials.

Figure 3:
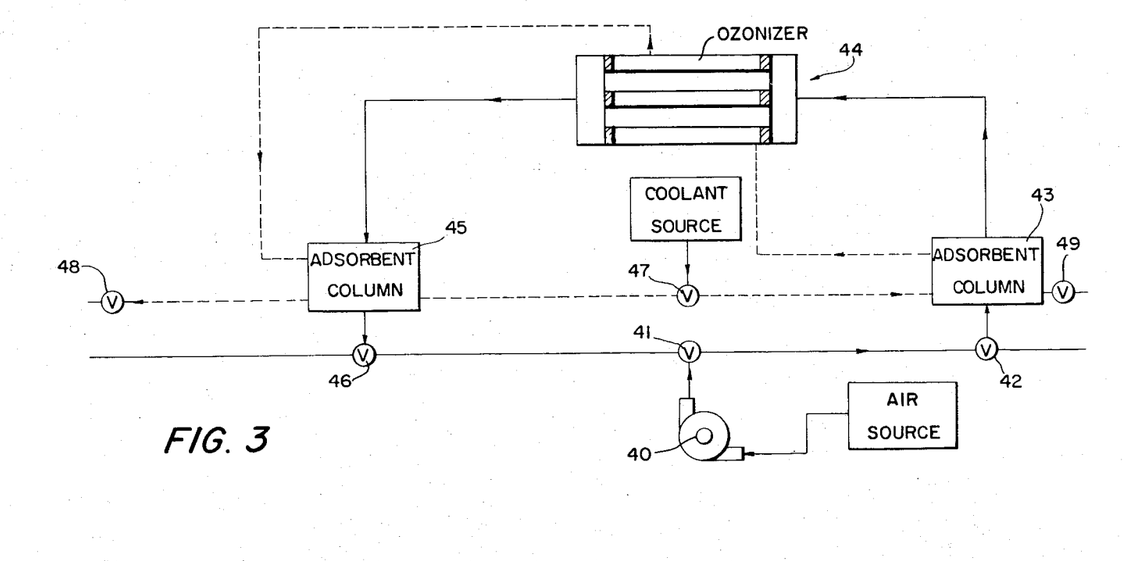
FIG. 3 is a schematic view of a system employing two adsorbent columns and a coolant system for cooling only one of the ozonizer electrodes; and The schematically represented system of FIG. 4 is the same as that of FIG. 3, except that suitable valves and pumps are employed to provide a higher pressure in at least one adsorbent column.

Another embodiment of the system according to the present invention and employing the principles of FIG. 1 is shown in FIG. 3, wherein only two adsorbent columns are employed and only one of the electrodes of the ozonizer, preferably the ground electrode, is cooled. According to a first cycle of flow, the oxygen containing fluid passes serially through the pump 40, the three-way valve 41, the three-way valve 42, the adsorbent column 43, the ozonizer 44, the adsorbent column 45, and the three-way valve 46 to the means for conveying the product ozone containing gas to an area for storage or use. During this cycle, the flow of coolant water is from its source through the three-way valve 47, the heat exchanger (not shown) in the adsorbent column 43, through the heat exchanger within the ozonizer 44 to cool only one of its electrodes, through the heat exchanger (not shown) within the adsorbent column 45, (which is operating as desorbent column) and through the valve 48 for discharge.

After a certain time interval of the operation the various valves are actuated so that the flow of oxygen containing fluid is from the air source through the pump 40, three-way valve 41, three-way valve 46, adsorbent column 45, ozonizer 44, adsorbent column 43 (which at this point now operates as a desorbent column) and three-way valve 42 to the means for discharging the product gas containing ozone for storage or use. Simultaneously with this reversed cycle, the coolant fluid flows from its source through the three-way valve 47, the heat exchanger within the adsorbent column 45, the heat exchanger for the one electrode within the ozonizer 44, the heat exchanger within the adsorbent column 43 (operated in desorbent mode) and through the valve 49 to be discharged.

Figure 4:
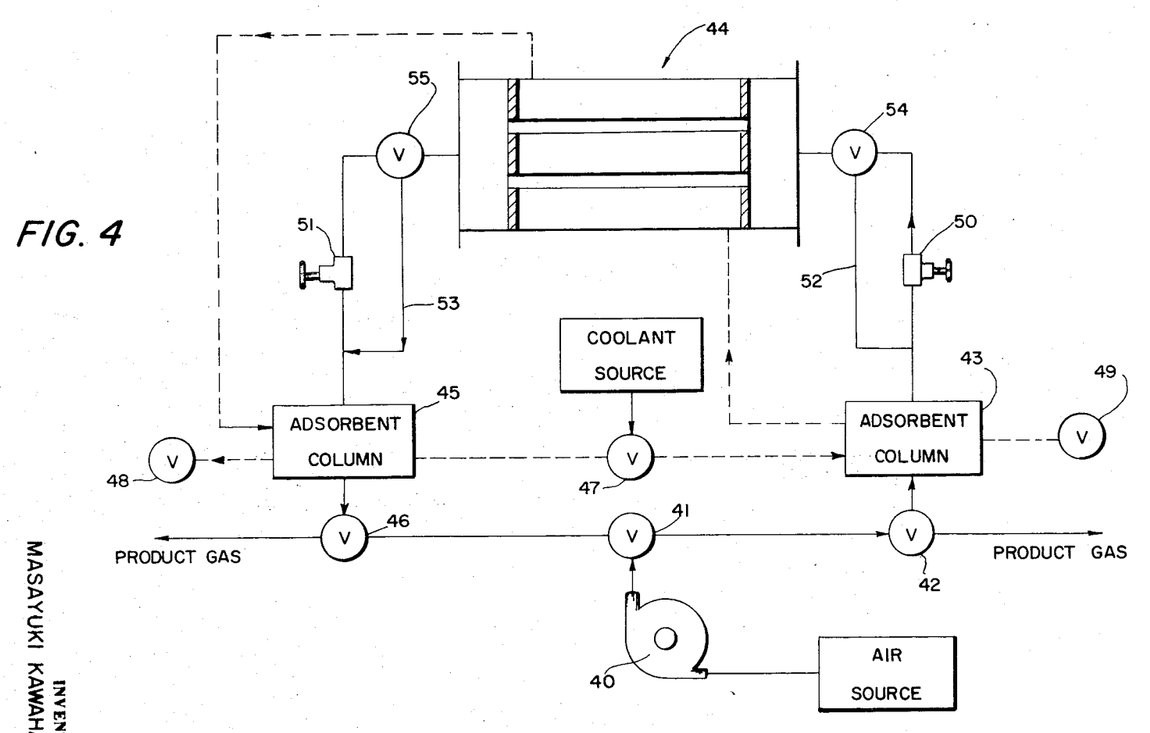

The system according to FIG. 4 is identical to the system according to FIG. 3, except for the addition of a higher capacity pump or compressor to produce a substantial pressure in the oxygen containing fluid that is more than that required merely to move the fluid through the various components. Thus, the same numerals have been used with respect to FIG. 4 as have been used with respect to FIG. 3 for identical components. In addition to the structure of FIG. 3, an adjustable throttle valve 50 has been inserted in series between the adsorbent column 43 and the ozonizer 44, and a similar throttle valve 51 has been serially inserted between the adsorbent column 45 and the ozonizer 44. Also, by-pass lines 52 and 53 have been provided with three-way valves 54 and 55 for selectively by-passing the throttles 50, 51, respectively.

Thus, the ozonizer may be operated at the same pressure as only one of the adsorbent columns, which pressure may be lower or higher than the pressure within the remaining adsorbent column. For example, with flow from the adsorbent column 43 through the ozonizer 44 and to the adsorbent column 45, the valves 54 and 55 may be actuated so that only the throttle 50 is operative to place the adsorbent column 43 at a substantially higher pressure than the ozonizer 44 and the adsorbent column 45; alternatively, the valves 54 and 55 may be reversed so that the adsorbent column 43 and ozonizer 44 are both at the same pressure that is substantially higher than the pressure within the adsorbent column 45. The valves 54 and 55 are reversed whenever the flow of oxygen containing fluid and coolant fluid is correspondingly reversed. It is preferred to have only the adsorber at the higher pressure.

In all of the preceding systems, the actuation of the various valves may be manual or simultaneously automatic in response to signals received from a control apparatus employing a moisture sensor in the ozonizer.

Oxygen Supply Gas

The starting material, that is, the oxygen containing fluid used to produce the ozone, may be air, oxygen or any other oxygen containing gas. The concentration of various components is not critical, but higher concentrations of oxygen will produce correspondingly higher concentrations of ozone. Preferably, air is employed because it is the cheapest and the present system is not bothered by the usual disadvantage of air containing moisture.

It is desirable to eliminate all hydrocarbons from the ozonizer, because they tend to hinder the formation of ozone. Usually, the starting gas is pumped into the system by means of a compressor. When the output of the compressor or pump contains hydrocarbons, usually oil vapor, a suitable filter device is employed to remove the hydrocarbon, before the gas enters the first adsorber column. These hydrocarbons may also be removed and returned, like moisture, by the adsorbents according to the present invention. However, it is also contemplated that an oiless pump, for example a liquid piston pump (Nash pump), may be used so that pretreatment to remove hydrocarbons is not necessary.

When oxygen or gases containing oxygen richer than air are employed in the systems according to the present invention, such gases are usually recirculated into the ozonizer. Such recirculation may be employed in the present system by appropriate modification in a well known manner in accordance with the teaching of the open literature. When employing such recycling of the oxygen containing gas, the recycled gas may be high in water content and may even be saturated with water. The systems according to the present invention may also be used advantageously over conventional systems even for such recirculation of the oxygen containing gases, without ill effects.

The Adsorbents

The adsorbent that is used in the columns according to the present invention may be of many known types, but has the properties of: (a) high adsorption capacity of water vapor; (b) adsorption reversibility with no appreciable hysteresis between adsorption and desorption isotherms for water vapors; and (c) no appreciable adsorption capability of ozone or no appreciable catalytic ozone decomposition properties.

Specific examples of adsorbents include: synthetic or natural zeolite molecular sieves (Union Carbide Company, Linde Molecular Sieve Division, W. R. Grace Chemicals), activated alumina, silica gel, activated carbons, and synthetic or natural clay materials such as chabetite and Fullers earth.

Some of the above materials will adsorb ozone to some extent and experience has indicated that the requirement (b), above, is not too strict. Through this experience it has been found that even though some of the compositions have a capability to adsorb or decompose ozone, such properties of the adsorbents may be modified so that they may be successfully used in the adsorbent columns. During initial adsorption-desorption cycles, the capability of the adsorbent to adsorb or decompose ozone tends to diminish, even if such undesirable properties of the adsorbent exist originally. The exact cause for this phenomena has not been clarified, but some modification of the adsorption properties of the adsorbent by repeating the dosage of ozone and water vapor may be thought responsible. Also during the desorption period water vapor which diffuses out from the interior surface of the adsorbent through the pore structure may hinder the diffusion of ozone into the adsorbent internal surface, resulting in reduction of possible adsorption or decomposition of ozone by the adsorbent. Thus, after a few cycles of adsorption-desorption, the adsorbent materials no longer have the capability of adsorbing or decomposing ozone to any appreciable extent. Because of this, an adsorbent material that otherwise might be rejected because of its initial capabilities with respect to ozone may be still used for its desirable properties with respect to adsorbing and desorbing water.

Ozonizer

Although the present invention has been specifically described with respect to an electric discharge ozonizer, other types of ozonizers may be used. When an electric discharge ozonizer is used, the electric field strength in the gaseous phase where electric discharge occurs is maintained at approximately 30 KV/cm. The cycle of A.C. preferably is 50–10,000 Hertz.

Other devices for ozone production may be used, including those that use a photochemical reaction (ultraviolet), nuclear radiation, and plasmajet. These latter types of ozonizers also require drying of the oxygen containing fluid for efficient production of ozone. Thus, the system of the present invention may be employed with many types of ozonizers that are conventional per se. Literature relating to these types of ozonizers and others may be found from the following:

E.K. Rideal: Ozone, Constable & Co., Ltd. (1920)
V.A. Hann, T.C. Manley: Encyclopedia of Chemical Technology, 9, 735 (1952)
G. Glockler & S.C. Lind: The Electrochemistry of Gases and Others
American Chemical Society: Ozone Chemistry and Technology, Advanced Chemistry Series, (1959)
Electric Engineering Society, Japan: Ozonizer Handbook (in Japanese), Tokyo (1960)

Coolant

The coolant fluid used in the coolant cycle for the above-described systems is preferably water, but may be any type of fluid. No special refrigeration equipment is required and the discharged hot water may be passed through an air cooled heat exchanger for cooling and recirculation. When using electric discharge ozonizers, cooling of one electrode of the ozonizer, preferably the ground electrode, is sufficient when the electric discharge power density, in watts per unit area of the electrode surface area is low, for example, less than 0.2 watts/cm$^2$. However, with higher discharge power densities, for example, above 0.2 watts/cm$^2$, both electrodes of the ozonizer must be cooled. Preferably, the coolant flow will be co-current to the flow of oxygen containing fluid, and the flow of the coolant will be reversed with each reversal of the oxygen containing fluid flow.

Pressure

The pressure of the discharged fluid containing ozone would depend upon the ultimate use of the ozone fluid. The adsorber, ozonizers and desorber may operate at the same pressure, neglecting the pressure drop caused by friction losses within the piping system. The pressure employed for such a system may be within the range from 1–100 psia, depending upon the utilization of the product ozone. Higher and lower pressures may be employed. The specific systems according to FIGS. 2 and 3 will operate with the adsorber, desorber and ozonizer utilizing the same pressure which preferably will be atmospheric pressure to avoid problems of sealing and high capacity pumps or compressors, particularly when air is used as oxygen containing fluid.

In the system according to FIG. 3, the pressure is higher in the adsorber and preferably the lower pressure exists both in the ozonizer and the desorber. For such a pressure differential, the extraction of water will be more efficient in that with the higher adsorber pressure, the saturation water vapor concentration in the adsorber feed gas decreases, resulting in a less amount of water vapor to be removed and a smaller amount of the adsorbent to be required. In addition, with a higher ratio of the adsorber pressure to the desorber pressure, the equilibrium water vapor concentration in the gas for the desorption cycle becomes lower, resulting in a more efficient desorption and a higher capacity of the adsorbent for the water vapor adsorption in the preceding adsorption cycle. Again, the pressure range will most likely depend upon the product ozone utilization, but may be within the range of 1–100 p.s.i.a. and the pressure ratio between the adsorber and the desorber may be in the range slightly above 1 and 20. However, pressures lower than 1 p.s.i.a. or higher than 100 p.s.i.a. and pressure ratios higher than 20 are contemplated.

Temperature

Lower temperatures are best for adsorption, but for practical purposes, room temperature is preferred. Generally, the lower the adsorber temperature, the greater will be the efficiency of water vapor adsorption. For practical applications, the adsorbents are kept at 0°–40C. by using a cold water cooling system. Temperatures below 0°C. may be advantageously employed with suitable refrigeration systems that are commercially available. However, with the present system, no refrigeration is necessary, which is an advantage.

Generally, the higher the desorption temperature, the greater will be the desorption efficiency with respect to stripping the water vapor from the adsorbent. However, the higher desorption temperature may cause appreciable ozone decomposition, which is undesirable. Thus, for practical applications, the desorber temperature is preferably maintained in a range from 10°–60C. However, temperatures lower than 10°C. and higher than 60°C. are contemplated.

Time

The cycle time between switchings from the adsorber to the desorber or from the desorber to the adsorber may be designed to be in a range between 2 minutes and 3 hours, depending upon the ozonizer capacity. With the use of the present system, the capacity of the adsorber or desorber required may be reduced as the switching cycle time is shortened. The switching time may be designed shorter than 2 minutes or longer than 3 hours if desired. Thus, the adsorbent columns may be made quite smaller with the present invention than have been previously employed.

Weight

The weight of the adsorbent required will depend upon the water vapor content in the feed gas, the pressure of the adsorber and desorber, the flow rate of the gas and switching cycle time. As mentioned before, advantages of the present system may be obtained by pressurization and decreased switching time with respect to the amount of adsorbent required.

Flow Rate

The flow rate of the gas through the adsorber and the desorber is determined by concentration and amount of ozone to be obtained, ozonizer reaction configuration, and energy input to the ozonizer. Practical linear flow rate of the gas through the adsorber or the desorber is in the range between 0.05 and 100 feet per second. Linear velocity outside this range may be employed if so desired.

Humidity

The inlet humidity of the oxygen containing fluid, strictly speaking the inlet gas to the compressor or pump, may be as high as 100 percent relative humidity at atmospheric pressure. The dew point of the oxygen containing feed gas at the adsorber outlet may be as low as −60°F. Preferably, environmental air is employed as the oxygen containing feed gas with a typical, relative humidity of 80 percent. In any event, refrigeration is entirely eliminated as a necessity for the dehumidification step.

Elimination of the refrigeration system and reduction of the adsorbent column capacity (which heretofore have been mutually exclusive) in conjunction with the fact that there is no requirement for thermal regeneration of the adsorbent bring forth substantial reduction in capital and operating cost of the ozone production system. Comparing regular pressure swing regeneration method, wherein a part of the dry gas produced from the adsorber under high pressure is used for regeneration, the present invention eliminates such waste of the dry gas. At the same time, the present invention substantially reduces the adsorber pressure and the amount of adsorbent required, since all the dry gas is employed for ozone production and subsequent regeneration of the adsorbent. Substantial reduction in capital and operational cost is evident.

Usage

Due to the advantages of the present system, it is ideally suited for particular types of usage, although its usage is not restricted thereby. Product ozone containing gas is usually used in situ at the site of the production since ozone decomposes fairly rapidly. If suitable means to stabilize the ozone are employed, including adsorption techniques collection of the ozone or a storage of the ozone may be employed. When oxygen or gases containing oxygen richer than air are employed in the systems according to the present invention, such gases are usually recirculated into the ozonizers by any suitable means known to the art. When employing such recycling of the oxygen containing gas, the recycled gases may be high in water content and may even be saturated with water. The systems according to the present invention may also be used advantageously over conventional systems even for such recirculation of the oxygen containing gases, without ill effects.

The following two examples of specific usage are given:

1. Ozone Treatment of Water and Waste Water

Ozone is injected in water or waste water to achieve oxidation of impurities in the water as well as disinfection of the water. For such applications, ozone is produced most economically by feeding atmospheric air into the systems according to the present invention. The existence of water vapor in the outlet gas of the present systems does not interfere with any water treatment chemical reactions by the produced ozone.

2. Ozone Treatment of Air

Ozonization of air may be used for sterilizing the air. For this purpose, the existence of moisture in the ozone-containing product may in fact be advantageous for example so that the resultant air is not dried by dilution with dry gas. In this respect, the systems of the present invention are advantageous over conventional ozonizers that do not contain moisture in their product ozone-containing gas. For such air treatment, it is advantageous to employ air as the oxygen containing gas in the system; thus, the original humidity of the air that was removed prior to passing through the ozonizer is recovered and advantageously returned to the product gas.

In the above two examples, the adsorbent column (adsorber or desorber) adsorbs or desorbs water vapor in the inlet oxygen-containing gas. Ozonizers are used in various chemical industries that primarily feed dry oxygen. One typical example is oxidation of hydrocarbons. The oxygen is recycled into the ozonizer after the removal of the reaction products. The recycled gas usually contains a small amount of hydrocarbons, which hinder the formation of ozone in the ozonizer. Thus, it is contemplated that the systems of the present invention may advantageously be employed by adsorbing the hydrocarbons in the recycled gas and by desorbing them into the product gas of the ozonizer. In this case, the function of the adsorbent columns will include the adsorption and desorption of hydrocarbons so that no separate apparatus for removing the hydrocarbons is necessary.

Although preferred embodiments have been described in detail along with various modifications and variations, these are not limiting and the scope of the invention is to be determined by the claims. Specific examples of hydrocarbons that could be so adsorbed and desorbed are fatty acids and vegetable oils.

EXAMPLE OF OPERATION

A flow sheet for the apparatus employed in the following specific example was essentially the same as that in FIG. 4, except that only the ozonizer was cooled by running cold water. The adsorbent columns which were used for the adsorber and the desorber were each a 25 mm I.D. glass tube. The ozonizer was an electric discharge type supplied from the Ozone Research Corporation, Pheonix, Arizona.

Air was pumped into the adsorber after passing successively through a filter (0.3 micron pore size), an activated carbon column and a water vapor saturator, in order to eliminate contaminants, such as dusts and oil vapors from the air and to saturate it with water vapor. The opening of the needle valve was adjusted to control the pressure in the adsorber and in the water vapor saturator at 28–29 psia. The ozonizer and the desorber were operated under 14.7 psia. Primary electric current for the ozonizer was in a range between 0.26 and 0.28 amperes for all the runs.

Ozone concentrations in the desorber outlet gas were determined in each switching cycle by the standard iodometric method. Occasionally, ozone concentration in the ozonizer outlet gas was determined by feeding dry air directly into the ozonizer. This ozone concentration was used as a control.

Run 1

In this run 50 g. of molecular sieves 3A, 1/16 inch pellets, (Union Carbide Corporation, Linde Molecular Sieve Division), were placed in the adsorbent columns and the flow rate of air was controlled at 1.5 l/min. (NTP). The switching cycle from the adsorber to the desorber was once per one hour. The control ozone concentration was determined to be in a range between 0.75 and 0.85 mg/l. Ozone concentrations in the desorber outlet gas in each switching cycle were plotted against time or number of cycles which the adsorbent column experienced. From this plot, it was seen that ozone concentration in the outlet gas from the ozonizer system became steady at about 0.8 mg/l after about six repeating cycles of adsorption and desorption.

Run 2

In Run 2, flow rate of air was 500 cc/min (NTP) and the control ozone concentration in the ozonizer outlet gas was determined to be in a range between 16.4 and 17.7 mg/l. In the adsorbent columns 16 g. of molecular sieves 3A were placed. The switching cycle from the adsorber to the desorber was once per 1 hour. The operational results were plotted as in Run 1.

It was observed from the plot that outlet ozone concentration of the ozonizer system was stabilized at approximately 17.0 mg/l after about four repeating cycles of adsorption and desorption.

Run 3

Thirty grams of molecular sieves 4A, ⅛ inch pellet were placed in each adsorbent column and flow rate of air was controlled at 800 cc/min. The adsorber-desorber switching cycle was set at once in 30 minutes. The control ozone concentration was determined to be 13.4 mg/l. The operational results were plotted as in Run 2. It was observed from the plot that outlet ozone concentration was stabilized at 13.4 mg/l after approximately 17 repeating cycles of adsorption and desorption.

Run 4

In Run 4, 30 g. of molecular sieves 5A were placed in each adsorption column and air flow rate was set at 800 cc/min. The adsorber-desorber switching cycle was once in 40 minutes. It was observed that the outlet ozone concentration was essentially zero during the first three repeating cycles of adsorption and desorption, indicating that the molecular sieve 5A had a capability of ozone decomposition much higher than those of the molecular sieves 3A and 4A. The run was terminated at fourth cycle.

Run 5

In this Run, 30 g. of 10 to 20 Mesh silica gel (indicating type) was placed in each adsorbent column. All the experimental conditions were the same as those in Run 3. At the third adsorption-desorption cycle ozone outlet concentration was 1.4 mg/l, which was much lower than that observed in Run 3 for the same cycle, indicating stronger ozone decomposition properties of this silica gel. It was also observed that a part of the product ozone was consumed for reaction with dyestuff on the silica gel surface. The run was terminated at the fourth cycle.

Run 6

In Run 6, 30 g. of silica gel, 3–8 Mesh (supplied by Matheson, Coleman and Bell Co.), were placed in each adsorbent column. All the experimental conditions were the same as those in Run 3. Results obtained were plotted in as in Run 1. It was observed that after two adsorption-desorption cycles ozone concentration was stabilized at 14.2 mg/l, which was the control ozone concentration determined.

MAJOR FINDINGS

Major findings in these Runs are listed below:

1. The PRGF ozonizer system was operated satisfactorily for the operating conditions employed.
2. The outlet ozone concentrations of the PRGF ozonizer system was stabilized at the concentrations equal to the control ozone concentration determined, after experiencing certain mode of approach of the ozone concentration to the steady concentration.
3. Apparently the mode of approach of ozone concentration to the steady concentration depends upon nature of the adsorbent, and various operating conditions of the system including weight of the adsorbent, switching cycle time, flow rate of the air and humidity of the air.
4. It is postulated that apparently the molecular sieves employed have a certain capability to adsorb or decompose ozone, but such properties of the adsorbent tend to diminish after several repeating cycles of adsorption and desorption. Repeated dosage and removal of water vapor and/or ozone may be able to produce adsorbents ideal for the ozonizer system. Such adsorbents then have high adsorption capacity of water vapor and no capability to adsorb or decompose ozone. Chemical reagents other than water and ozone may be employed for this purpose.
5. Adsorbents which are reported to have the capability of ozone adsorption or decomposition in the literature may be employed for the ozonizer system of the present invention. Therefore, common water vapor adsorbents, including activated alumina, silica gel, activated carbons, synthetic or natural clay materials, such as zeolite, chabetite and Fullers earth may be used.

What is claimed is:

1. A method for the production of ozone, comprising:
   passing an oxygen containing fluid through a first adsorbent of water for adsorption to produce a dry oxygen containing fluid;
   passing the dry oxygen-containing fluid through an ozonizer and converting some of its oxygen into ozone to produce a dry ozone and oxygen-containing fluid;
   passing the dry mixture of oxygen and ozone-containing fluid through a second adsorbent of water for desorption stripping of water from the second adsorbent; and
   periodically reversing the preceding flow so that the oxygen-containing fluid flow is serially through the second adsorbent, the ozonizer and the first adsorbent.

2. The method of claim 1, including subjecting the oxygen-containing fluid to an electric discharge as it is passed between opposed electrodes of the ozonizer.

3. The method of claim 1, wherein each of said adsorbents includes a material selected from the group consisting of synthetic zeolite molecular sieve material, natural zeolite molecular sieve material, activated alumina, silica gel, activated carbons, chabetite and Fuller's earth.

4. The method of claim 1, wherein each of said adsorbents includes a material selected from the group consisting of synthetic and natural clay material.

5. The method of claim 1, including removing the heat of adsorption from the adsorbent upstream of the ozonizer and transferring the heat of adsorption to the adsorbent downstream from the ozonizer as the heat of desorption.

6. The method of claim 5, including the step of passing the coolant fluid in parallel circuits, the first coolant circuit including one electrode means of the ozonizer in series between the adsorbents, and the second coolant circuit including the other electrode means of the ozonizer in series between the adsorbents.

7. The method of claim 1, including the step compressing the oxygen-containing fluid upstream of the adsorbents and ozonizer, and throttling the oxygen-containing fluid to reduce its pressure immediately upstream of the ozonizer.

8. A method for the production of ozone, comprising:
   providing an oxygen-containing fluid, an ozonizer and two adsorbents;
   adsorbing at least one impurity from the oxygen-containing fluid by one adsorbent, passing the thus purified oxygen-containing fluid through the ozonizer to convert some of its oxygen into ozone, and returning by desorption the same impurity to the oxygen-ozone containing fluid downstream of the ozonizer by the second adsorbent so as to regenerate the second adsorbent; and
   thereafter adsorbing the impurity from the oxygen-containing fluid by the regenerated second adsorbent, passing the thus purified oxygen-containing fluid through the ozonizer to convert some of its oxygen into ozone, and returning by desorption the same impurity to the oxygen-ozone containing fluid downstream of the ozonizer by the one adsorbent so as to regenerate the one adsorbent.

9. The method of claim 8, automatically switching between the steps of the last two paragraphs in response to the concentration of the impurity in the oxygen-containing fluid between the adsorbents.

10. The method of claim 8, wherein the impurity is water.

11. The method of claim 8, wherein the impurity is a hydrocarbon.

12. The method of claim 8, wherein the impurity is a mixture of water and a hydrocarbon.

* * * * *